(12) United States Patent
Denning (10) Patent No.: US 7,119,516 B2
(45) Date of Patent: Oct. 10, 2006

(54) CORDLESS POWER TOOL WITH TOOL IDENTIFICATION CIRCUITRY

(75) Inventor: Bruce S. Denning, Fallbrook, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

(21) Appl. No.: 11/110,255

(22) Filed: Apr. 20, 2005

(65) Prior Publication Data

US 2005/0248309 A1    Nov. 10, 2005

Related U.S. Application Data

(60) Provisional application No. 60/568,038, filed on May 4, 2004.

(51) Int. Cl.
*H02J 7/00* (2006.01)
(52) U.S. Cl. .................................... 320/106
(58) Field of Classification Search ................ 320/106, 320/109, 110, 112
See application file for complete search history.

(56) References Cited

U.S. PATENT DOCUMENTS

| | | | | |
|---|---|---|---|---|
| 5,717,306 A | * | 2/1998 | Shipp | ......................... 307/125 |
| 6,560,417 B1 | * | 5/2003 | Rodriguez | .................... 399/27 |
| 6,695,837 B1 | * | 2/2004 | Howell | ........................ 606/29 |
| 6,809,649 B1 | * | 10/2004 | Wendelrup et al. | ....... 340/636.1 |
| 6,892,310 B1 | * | 5/2005 | Kutz et al. | ................... 713/300 |
| 6,913,087 B1 | * | 7/2005 | Brotto et al. | .................. 173/1 |
| 2002/0138159 A1 | * | 9/2002 | Atkinson | ..................... 700/21 |

OTHER PUBLICATIONS

International Search Report with Written Opinion from related PCT application dated Nov. 15, 2006.

* cited by examiner

*Primary Examiner*—Karl Easthom
*Assistant Examiner*—Samuel Berhanu
(74) *Attorney, Agent, or Firm*—Grossman, Tucker, Perreault & Pfleger, PLLC (57) ABSTRACT

A cordless power tool may include tool identification circuitry to provide a tool identification signal to a battery pack. The tool identification signal may be representative of data particular to the cordless power tool. A method may include coupling a battery pack to a cordless power tool, and providing a tool identification signal to the battery pack from the cordless power tool once the battery pack is coupled to the cordless power tool, the tool identification signal representative of data particular to the cordless power tool.

18 Claims, 7 Drawing Sheets

CORDLESS POWER TOOL WITH TOOL IDENTIFICATION CIRCUITRY

CROSS REFERENCE TO RELATED APPLICATIONS

This application claims the benefit of the filing date of U.S. Provisional Application Ser. No. 60/568,038, filed May 4, 2004, the teachings of which are incorporated herein by reference.

FIELD

The present disclosure relates to cordless power tools and, more particularly, to a cordless power tool with tool identification circuitry.

BACKGROUND

A wide variety of cordless power tools are available that may be utilized in different applications such as construction applications, fire and rescue applications, etc. Some examples of cordless power tools include, but are not limited to, cordless drills, cordless circular saws, cordless reciprocating saws, cordless sanders, cordless screwdrivers, and flashlights. Cordless power tools may utilize a rechargeable battery pack for providing power to operate the tool. The rechargeable battery pack may be readily removed from the cordless power tool and coupled to an external battery charger for charging purposes.

The battery pack may include one or more battery cells. The battery pack may also include monitoring circuitry to monitor parameters such as cell voltage levels, discharge current, and charging current. There are many different cordless power tools and battery packs. A battery pack may be designed for use in several cordless power tools. However, there is no way of notifying the battery pack of any particulars of the cordless power tool. Accordingly, there is a need for tool identification circuitry to notify an inserted battery pack of data particular to that cordless tool.

BRIEF SUMMARY OF THE INVENTION

According to one aspect of the invention, there is provided a cordless power tool. The cordless power tool may include tool identification circuitry to provide a tool identification signal to a battery pack. The tool identification signal may be representative of data particular to the cordless power tool.

According to another aspect of the invention, there is provided a method. The method may include coupling a battery pack to a cordless power tool, and providing a tool identification signal to the battery pack from the cordless power tool once the battery pack is coupled to the cordless power tool. The tool identification signal may be representative of data particular to the cordless power tool.

According to yet another aspect of the invention there is provided a battery pack. The battery pack may include at least one battery cell, and monitoring and control circuitry. The monitoring and control circuitry may be configured to receive a tool identification signal from a cordless power tool once the battery pack is coupled to the cordless power tool. The tool identification signal may be representative of data particular to the cordless power tool.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
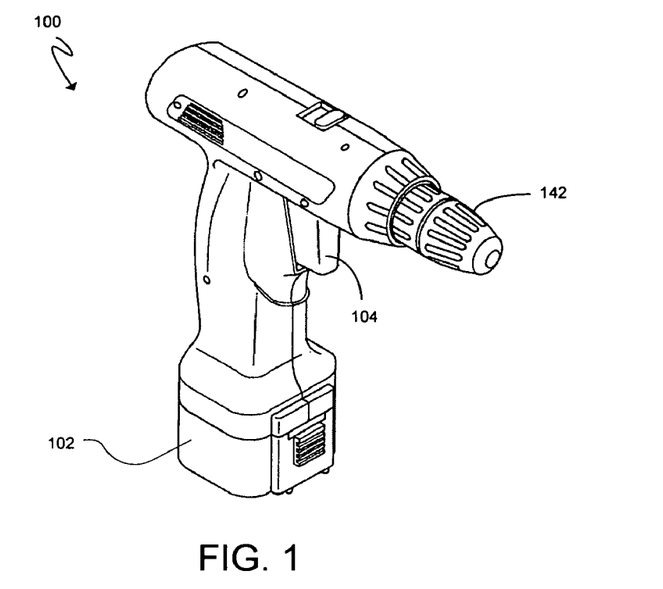
FIG. 1 is a perspective view of a cordless power tool.

FIG. 1 is a perspective view of a cordless power tool 100. The cordless power tool 100 is illustrated as a cordless drill and may be described as such in relation to embodiments herein. However, the cordless power tool 100 may be any type of cordless power tool including, but not limited to, a cordless circular saw, a cordless reciprocating saw, a cordless sander, a cordless screwdriver, and a flashlight. The cordless power tool may include a rechargeable battery pack 102 for providing power to operate the tool 100. The rechargeable battery pack 102 may be readily removed from the cordless power tool 100 and coupled to an external battery charger for charging purposes. The cordless power tool 100 may also include a trigger 104. For the drill, a user may depress and release the trigger 104 to control the speed of the chuck 142. For other tools such as a flashlight, a user may position a trigger to control a level of illumination from the flashlight.

Figure 2:
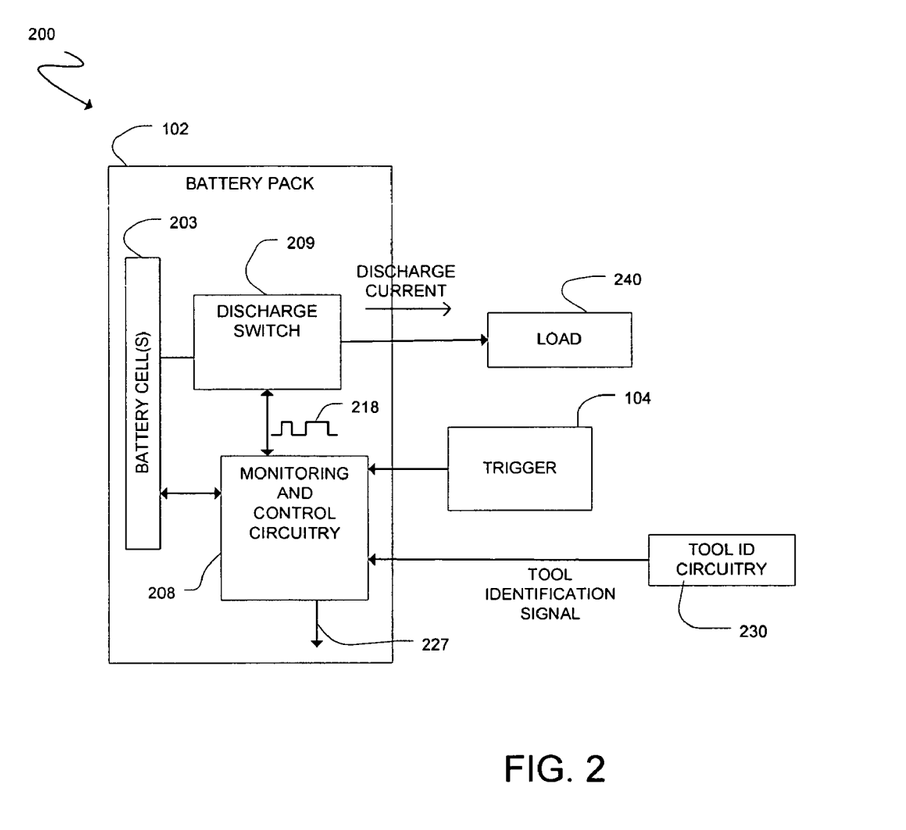
FIG. 2 is a diagram of a power supply system of the cordless power tool of FIG. 1.

FIG. 2 is a diagram of a power supply system 200 of the cordless power tool of FIG. 1. The power supply system 200 may include the battery pack 102, a load 240, the trigger 104, and tool identification (ID) circuitry 230. As used in any embodiment herein, "circuitry" may comprise, for example, singly or in any combination, hardwired circuitry, programmable circuitry, state machine circuitry, and/or firmware that stores instructions executed by programmable circuitry.

The battery pack 102 may include one or more battery cells 203 to provide power for the system 200. The battery cells 203 may be lithium ion cells in one embodiment. The battery pack 102 may provide power to the load 240 via the discharge switch 209. In one embodiment, the discharge switch may be a field effect transistor (FET). The battery pack 102 may also include monitoring and control circuitry 208. The monitoring and control circuitry 208 may measure one or more of battery pack current, temperature, and cell voltage levels for each battery cell.

The monitoring and control circuitry 208 may compare measured values to associated threshold levels and identify an overload condition if one of the measured quantities is greater than or equal to the associated threshold level. For example, an overload condition may be a discharge current greater than or equal to a threshold representative of a maximum discharge current. In another example, an overload condition may be a charging current level to the battery cells 203 greater than or equal to a threshold representative of a maximum charging current. In yet another example, an overload condition may be a voltage level of a battery cell greater than or equal to a voltage threshold. In yet another embodiment, an overload condition may be a temperature of a component greater than or equal to a temperature threshold. Upon detection of an overload condition, the monitoring circuitry 208 may provide an output control signal to protect components of the power supply system 200. The output control signal may be provided to one or more switches within the battery pack 102 or may be provided as a control input to other circuitry located outside the battery pack 102 via path 227. In one embodiment, the output control signal may be provided to the discharge switch 209 to open the switch 209 where the overload condition is a discharge current from the battery cells 203 greater than or equal to a maximum discharge current threshold.

The monitoring and control circuitry 208 may also be responsive to the position of the trigger 104 to provide a control signal to the discharge switch 209. The control signal may be a pulse width modulated (PWM) signal 218 in one embodiment and the discharge switch 209 may be responsive to the duty cycle of the PWM signal 218 to control the discharge current. The PWM signal 218 may operate at a fixed frequency, e.g., such as 5 to 10 kilohertz (KHz). As the duty cycle of the PWM signal is increased, the ON time of the discharge switch 209 may be increased and hence the level of discharge current provided to the load 240 may be increased. Similarly, as the duty cycle of the PWM signal is decreased, the ON time of the discharge switch may be decreased and hence the level of discharge current provided to the load 240 may be decreased.

The tool ID circuitry 230 may provide a tool identification signal to the monitoring and control circuitry 208. The tool identification signal may be representative of data particular to the cordless power tool such as power parameters of the particular cordless power tool. For example, the tool identification signal may specify a maximum discharge current of the particular cordless power tool. As another example, the tool identification signal may specify a thermal overload point of the cordless power tool. In one embodiment, the monitoring and control circuitry 208 may provide a stimulus signal to the tool ID circuitry 230 and the tool identification signal may be provided in response to the stimulus signal.

The tool identification circuitry 230 may also assist with ensuring that the battery pack 102 is properly coupled to the cordless power tool and ensuring that the identity of the particular cordless power tool is supported by the battery pack. For instance, if the battery pack 102 is not properly coupled to the portable power tool, there may be an absence of a tool identification signal provided by the tool ID circuitry 230. In response, the battery pack 102 may deny a discharge current from being provided unless it receives a proper tool identification signal thereby improving system safety. The battery pack 102 may not be properly coupled to the portable power tool if a suitable mechanical and/or electrical connection between the battery pack and the portable power tool is not made.

As another example, a universal battery pack may be capable of physically being coupled to different cordless power tools, but may only be capable of supporting select tools. A battery pack inadvertently coupled to the wrong cordless power tool may cause degradation in the tool performance or may present safety concerns. Advantageously, the tool ID circuitry 230 may provide a tool identification signal representative of the identity of the particular cordless power tool. If the battery pack 102 can not support that tool, then the battery pack may deny discharge current and may even provide an indication of such an event thereby further improving system safety.

Figure 2A:
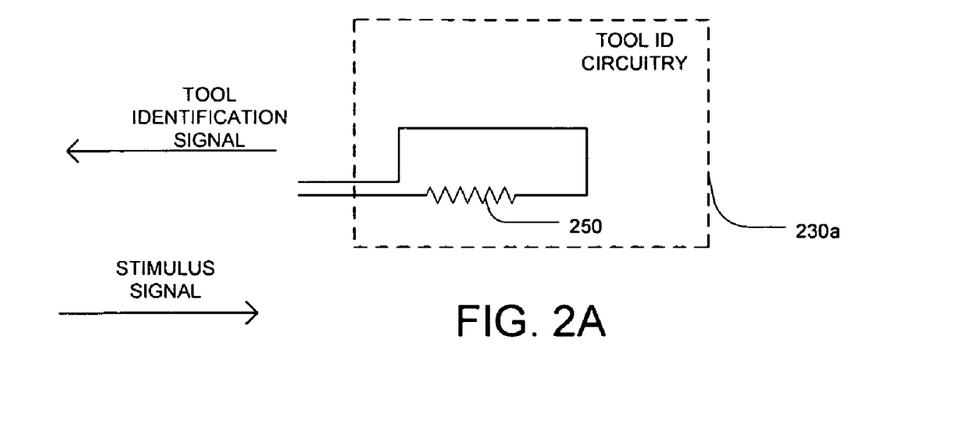
FIG. 2A is a diagram of one embodiment of the tool identification circuitry of FIG. 2.

FIG. 2A illustrates one embodiment 230a of the tool ID circuitry 230 of FIG. 2. The tool ID circuitry 230a may include a simple fixed resistor 250 having a fixed resistive value. The fixed resistive value may be representative of characteristic of the particular cordless power tool. For example, the characteristic may be a thermal overload point for the particular cordless power tool. The fixed resistor 250 may receive a stimulus signal, e.g., a current signal, from the monitoring and control circuitry 208. The tool ID circuitry 230 may then effectively provide the tool ID signal back to the monitoring and control circuitry 208 in response to this stimulus. The value of the fixed resistor 250, with a known stimulus signal, may provide a predictable response which can be measured and correlated to a particular tool characteristic.

Figure 2B:
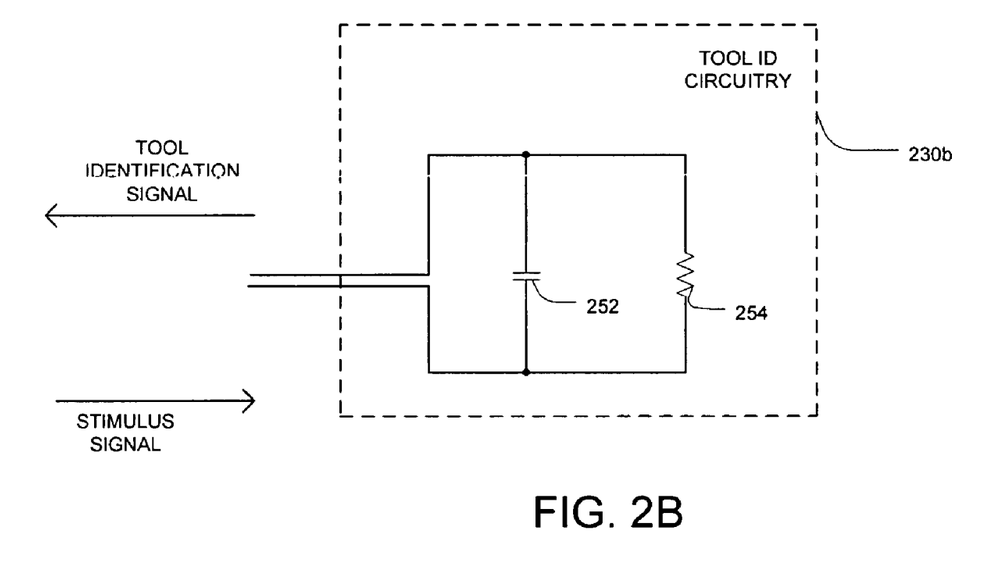
FIG. 2B is a diagram of another embodiment of the tool identification circuitry of FIG. 2.

FIG. 2B illustrates another embodiment 230b of the tool ID circuitry 230 of FIG. 2. The tool ID circuitry may include inexpensive passive components such as the capacitor 252 in parallel with the resistor 254.

Figure 2C:
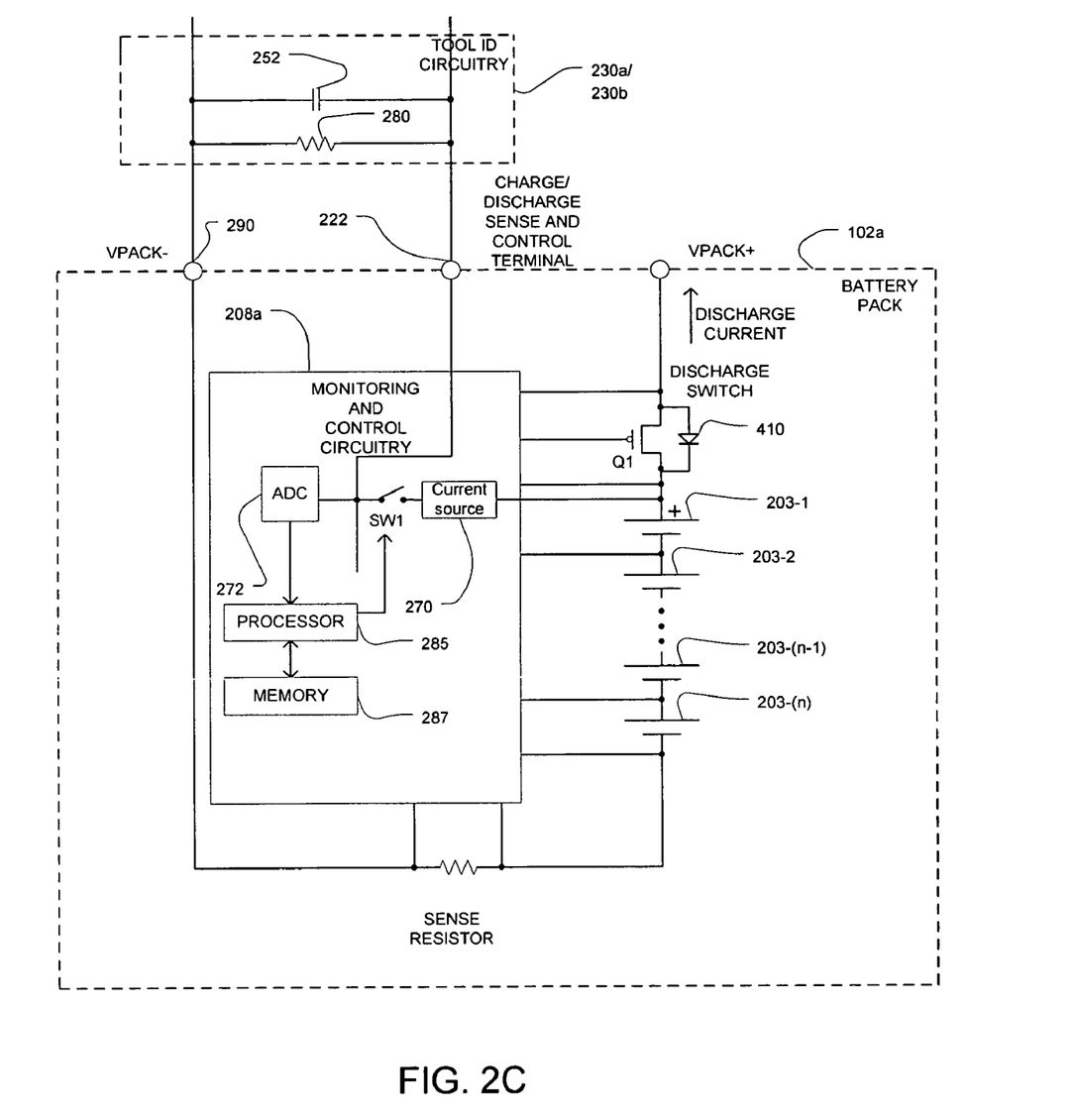
FIG. 2C is a diagram of an embodiment of monitoring and control circuitry for use with the tool identification circuitry of FIGS. 2A and 2B.

FIG. 2C illustrates an embodiment of monitoring and power control circuitry 208a that may be utilized with the tool ID circuitry 230a/230b of FIGS. 2A and 2B. The monitoring and control circuitry may include a current source 270, a switch SW1, an analog to digital converter (ADC) 272, a processor 285, and memory 287. The current source 270 may provide a relatively small constant current of, for example, 1 milliamp, up to some maximum voltage Vmax. The ADC 272 may read the voltage output by the current source 270 and provide the output to the processor 285. When the battery pack 102a is not coupled to the cordless power tool, switch SW1 may be closed. The switch SW1 may be controlled, directly or indirectly, by the processor 285. The voltage output of the current source 270 may then rise to its maximum voltage level Vmax since there is no load for the current source 270.

When the battery pack 102a is coupled to the cordless power tool, the current source 270 may provide a stimulus signal, e.g., a current signal, to the tool ID circuitry 230a/230b. The tool ID circuitry may then effectively provide a tool ID signal to the monitoring and control circuitry 208a depending on the value of the fixed resistor 280 since the resistive load from resistor 280 would be coupled to the current source 270. The resistor 280 may be the single resistor 250 of the embodiment of FIG. 2A or may be the resistor 254 of the embodiment of FIG. 2B. The value of the resistor 280 would therefore control the voltage drop of the current source 270 from its Vmax level as converted by the ADC 272 and provided to the processor 285. The processor 285 may then correlate, e.g., by accessing data from memory 287, the measured voltage level of the current source or the voltage drop of the current source from its Vmax level, to a particular cordless power tool characteristic. One power tool characteristic may be representative of an overload current limit. If the detected value of the resistor is too small, e.g., less than 100 ohms, this might be seen as a Vsense terminal 222 to Vpack-terminal 290 short and tool activation may be prohibited.

For the embodiment of FIG. 2B having the capacitor 252 in parallel with the resistor 254 (or 280 of FIG. 2C) the processor 285 may instruct the switch SW1 to open after decoding the first tool characteristic information obtained from the resistor 280. This would then cause the capacitor 252 to discharge across the resistor 280. The processor 285 may then correlate, e.g., by accessing data from memory 287, the measured discharge time to a second cordless power tool characteristic, e.g., a thermal overload point of the cordless power tool. This may also be done upon the battery pack 102 coupling to the cordless power tool if the charging time for the capacitor 252 is monitored and correlated to a tool characteristic.

Other embodiments of the tool ID circuitry 230 may include other approaches such as utilizing a microcontroller in the tool ID circuitry 230 that may be capable of communicating with the monitoring and control circuitry 208. A digital serial bus may also be utilized in other embodiments for communication between the tool ID circuitry 230 and the monitoring and control circuitry 208.

Figure 3:
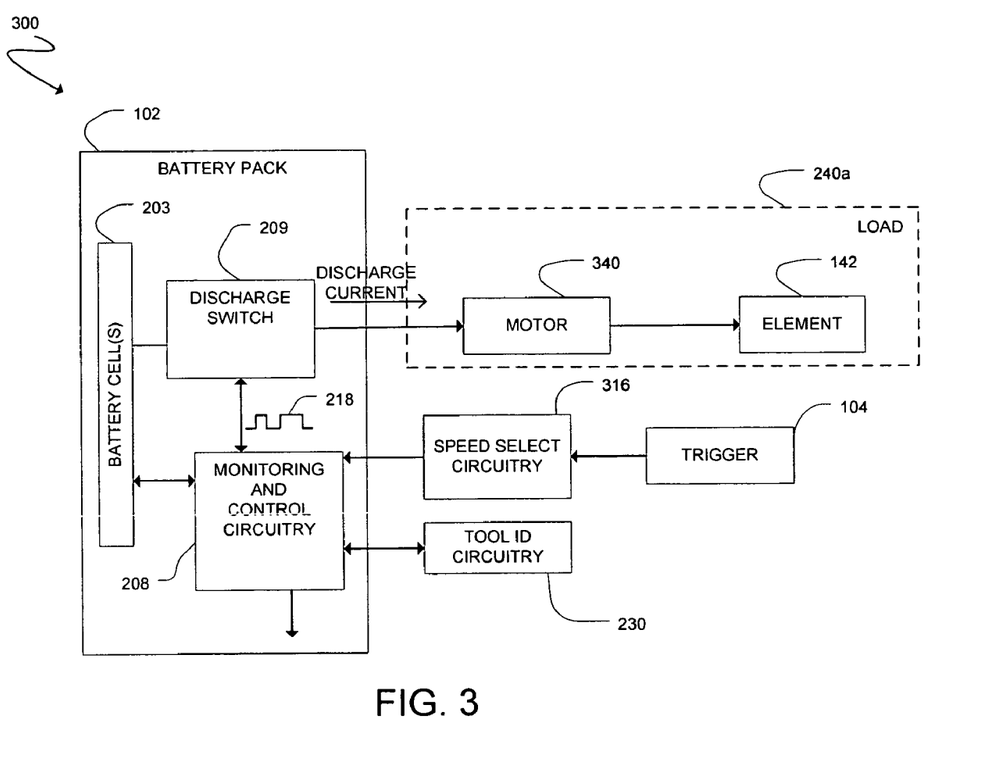
FIG. 3 is a diagram consistent with FIG. 2 where the load is a motor driving an element of the cordless power tool.

FIG. 3 is a diagram of a power supply system 300 consistent with the power supply system 200 of FIG. 2. Components of FIG. 3 similar to FIG. 2 are labeled as such and hence any repetitive description is omitted herein for clarity. The load 240a in FIG. 3 may be a motor 340 configured to drive an element 142 through an associated gear train (not illustrated). As one example, the element 142 may be the chuck of the drill of FIG. 1 that holds a drill bit. Advantageously, a conventional speed control switch that may be located in the cordless power tool at the input side to the motor 340 has been eliminated. In its place, the discharge switch 209 may control a discharge current and hence a speed of the element 142 driven by the motor 340.

Speed select circuitry 316 may receive a signal from the trigger 104 representative of a position of the trigger 104 and hence a desired speed of the element 142 of the cordless power tool. The speed select circuitry 316 may then provide an input signal to the monitoring and control circuitry 208 of the battery pack 102 representative of the desired speed. The monitoring and control circuitry 208 may then provide a control signal to the discharge switch 209 to control the speed of the element 142 by controlling the discharge current provided to the motor 340.

In operation, a user of the cordless power tool may depress the trigger 104 a desired amount to control the speed of the element 142. In response to the position of the trigger 104, the speed select circuitry 316 may provide an input signal to the monitoring and control circuitry 208. The monitoring and control circuitry 208 may include a PWM generator that modifies the duty cycle of the PWM signal 218 in response to the input signal from the speed select circuitry 316. The PWM signal 218 may operate at a fixed frequency, e.g., such as 5 to 10 KHz. As the duty cycle of the PWM signal is increased, the ON time the discharge switch 209 may be increased and hence the speed of the element 142 of the cordless power tool is also increased. Similarly, as the duty cycle of the PWM signal is decreased, the ON time of the discharge switch 209 may be decreased and hence the speed of the element 142 of the power tool may be decreased. In one example, the duty cycle of the PWM signal may vary from about 10% (slow speed) to 75% (fast speed).

Figure 4:
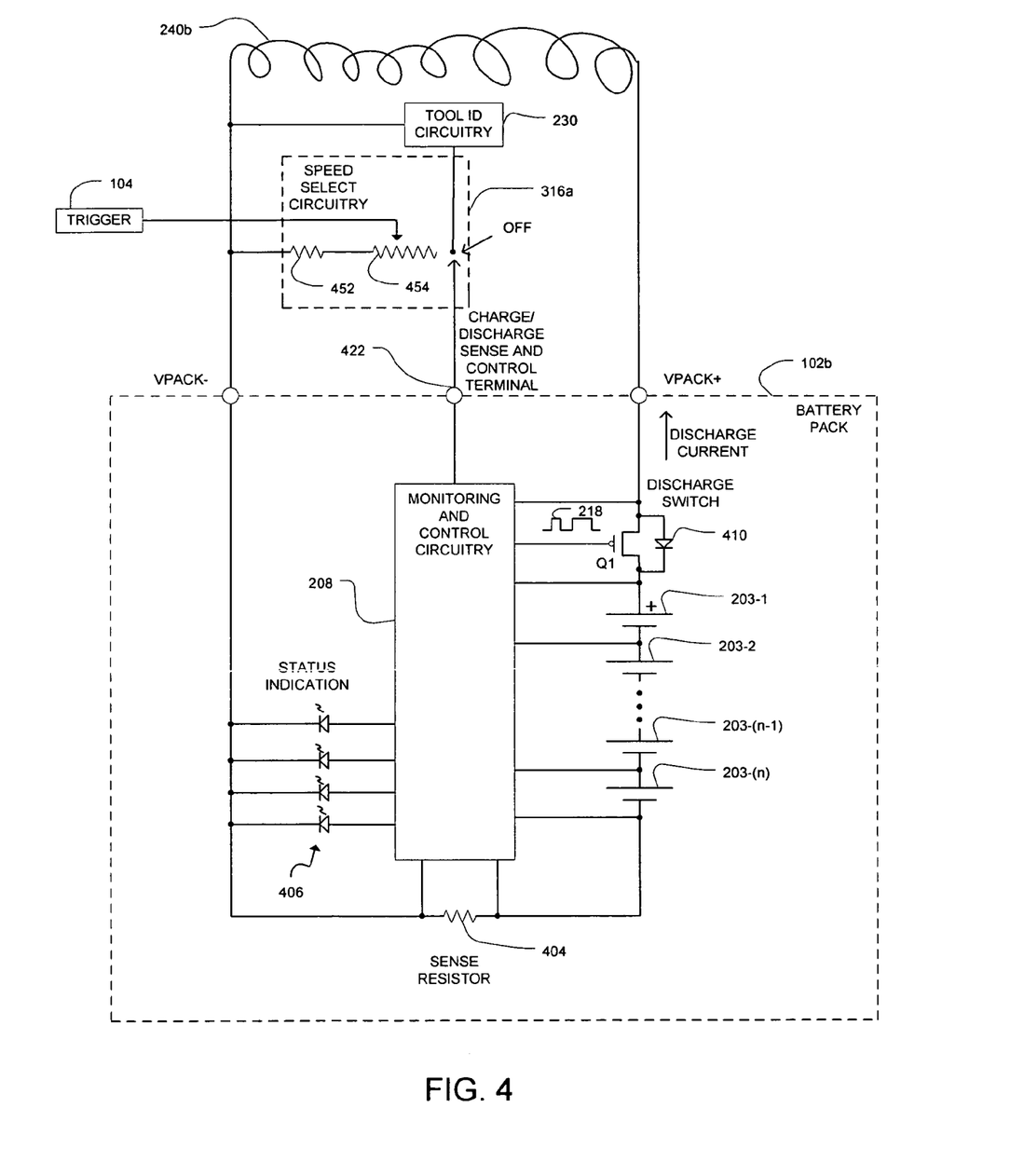
FIG. 4 is another diagram a power supply system for the cordless power tool of FIG. 1.

FIG. 4 is another diagram a power supply system for the cordless power tool of FIG. 1. The discharge switch 209 may be an FET Q1. The FET Q1 may be a metal oxide semiconductor field effect transistor (MOSFET) such as a p-channel MOSFET (PMOS) or n-channel MOSFET (NMOS). The battery pack 102b may also include a plurality of battery cells 203-1, 203-2, 203-(n–1), and 203-n. The battery pack 102b may supply power to a number of loads including a load 240b illustrated as a motor winding. A diode 410 may be connected in parallel with the FET Q1 to permit charging current flow into the battery cells 203-1, 203-2, 203-(n–1), and 203-n and to prevent discharge current from the battery cells. The battery pack 102a may include optional status indicators 406 to provide indication signals from the monitoring and control circuitry 208 of various detected conditions.

The speed select circuitry 316a may include a variable resistor 454 in series with another resistor 452. The variable resistor 454 may be a potentiometer. A resistance value of the variable resistor 454 may be set in response to the position of the trigger 104. The resistance value of the variable resistor 454 may therefore be representative of a desired speed of the element 142 (see FIG. 3). The resistance value of the resistor 452 may be representative of a maximum discharge current rate. This speed select circuitry 316a allows for inexpensive discharge limiting and/or variable power control for low cost cordless power tools such as flashlights. A third battery pack terminal 422 may be used by the monitoring and control circuitry 208 to receive information from the speed select circuitry 316a on the desired speed. In turn, the monitoring and control circuitry 208 may provide a PWM signal 218 at a particular duty cycle to achieve the desired speed.

Figure 5:
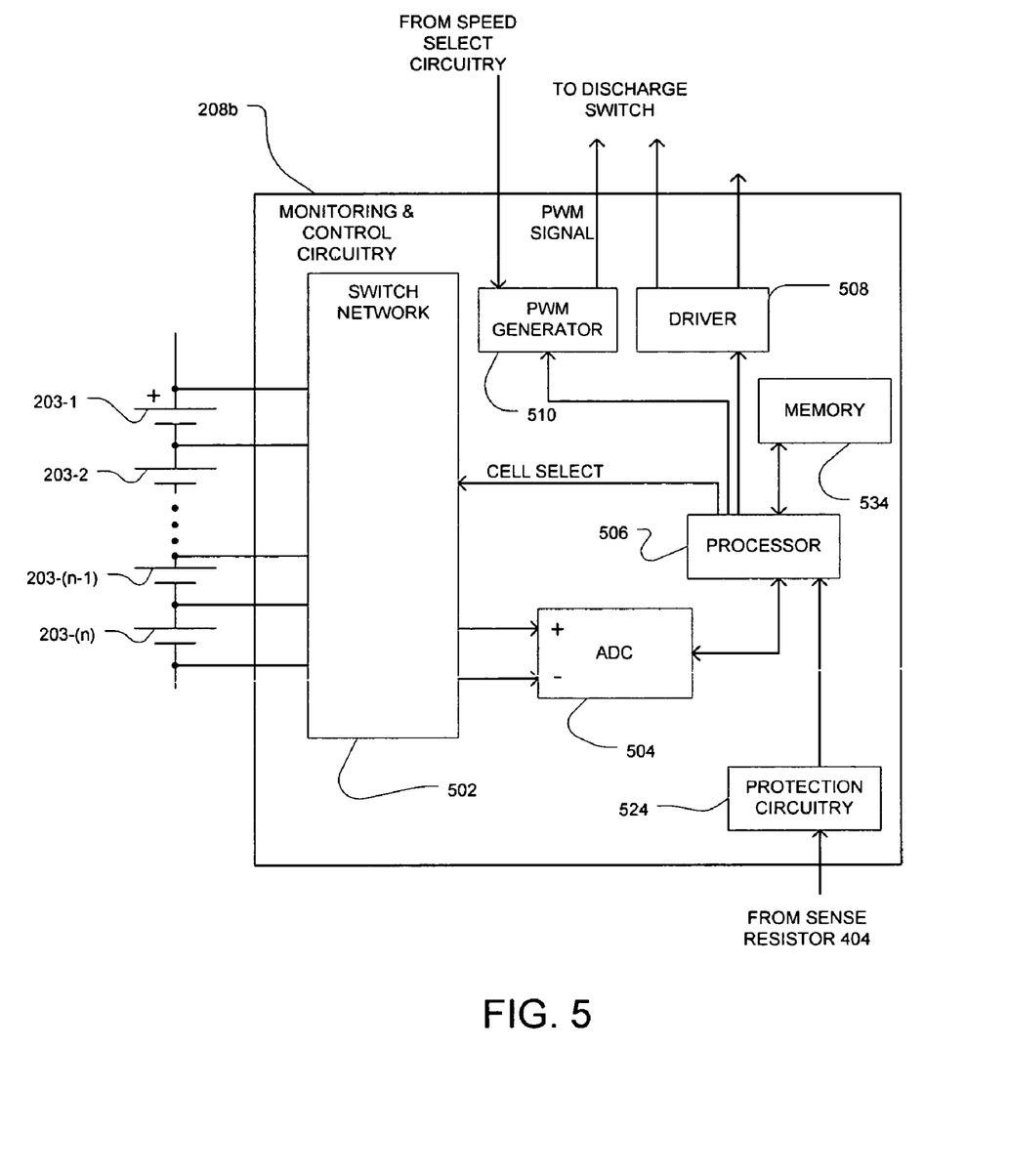
FIG. 5 is a diagram of another embodiment of the monitoring and control circuitry of FIG. 2.

FIG. 5 is another embodiment 208b of the monitoring and control circuitry 208. The monitoring and control circuitry 208b may include a switch network 502, an analog to digital converter (ADC) 504, a processor 506, a driver 508, memory 534, protection circuitry 524, and a PWM generator 510. The processor 506 may instruct the switch network 502 to select a particular battery cell 203-1, 203-2, 203-(n–1), or 203-n for monitoring. Individual analog cell voltage levels for each battery cell may then be sampled through the switch network 502. The sampled analog signals may then be converted into associated digital signals by the ADC 504 and provided to the processor 506. The processor 506 therefore receives digital signals from the ADC 504 representative of the voltage level of each battery cell 203-1, 203-2, 203-(n–1), and 203-n and may make comparisons to various voltage thresholds.

For example, during charging of the battery pack 102, the monitoring and control circuitry 208a may monitor the cell voltage levels to determine if any of the cell voltage levels exceeds an over voltage threshold. If such a threshold is exceeded, the processor 506 may instruct some preventative action to be taken. In one instance, such preventative action may be to stop charging by providing a signal to the driver 508 to drive a particular switch open. For example, during discharging of the battery pack 102, the monitoring and control circuitry 208a may monitor the cell voltage levels to determine if any of the cell voltage levels is less than an under voltage threshold. If such an under voltage threshold level is reached, the processor 506 may instruct some preventative action to be taken. In one instance, such preventative action may be to stop discharging by providing a signal to the driver 508 to drive a particular switch open.

The processor 506 may also instruct the switch network 502 to close a switch (e.g., switch SW1 of FIG. 2C) to have the ADC 504 monitor the voltage of the current source 270 (see FIG. 2C). The current source 270 may then provide a stimulus signal, e.g., a current signal, to the tool ID circuitry and the tool ID circuitry may then effectively provide a tool ID signal to the monitoring and control circuitry 208b that can be measured and correlated to a particular tool characteristic, e.g., by accessing data from memory 534 correlating various measured values to various tool characteristics.

The processor 506 may also receive other signals from the protection circuitry 524. The protection circuitry 524 may generally monitor the current flowing into (charging mode) or out of (discharging mode) the battery pack 102 for various current overload conditions, e.g., over current or short circuit conditions, and alert the processor 506 of such conditions so that preventative action can be taken. For instance, a current sensing element such as sense resistor 404 (FIG. 4) may provide the protection circuitry 524 with a signal representative of the current level to or from the battery pack as that current level varies. The protection circuitry 524 may compare the current level to various thresholds and provide a signal to the processor notifying the processor of an over current condition or a short circuit condition so the processor 506 can take preventative action.

The PWM generator 510 may receive a signal from the speed select circuitry 316, 316a and provide an output PWM signal to the discharge switch such as FET Q1 (see FIG. 4). The processor 506 may allow the PWM signal to control the state of the discharge switch until an overload condition occurs. When the overload condition occurs, e.g., excessive discharge current, the processor 506 may disable the PWM generator 510 and may instruct the driver 508 to open the discharge switch. As such, the monitoring and control circuitry 208a can advantageously enable the PWM generator 510 to control the discharge switch 209 when appropriate and it can also disable the PWM generator 510 and open the discharge switch if an overload condition is detected.

Figure 6:
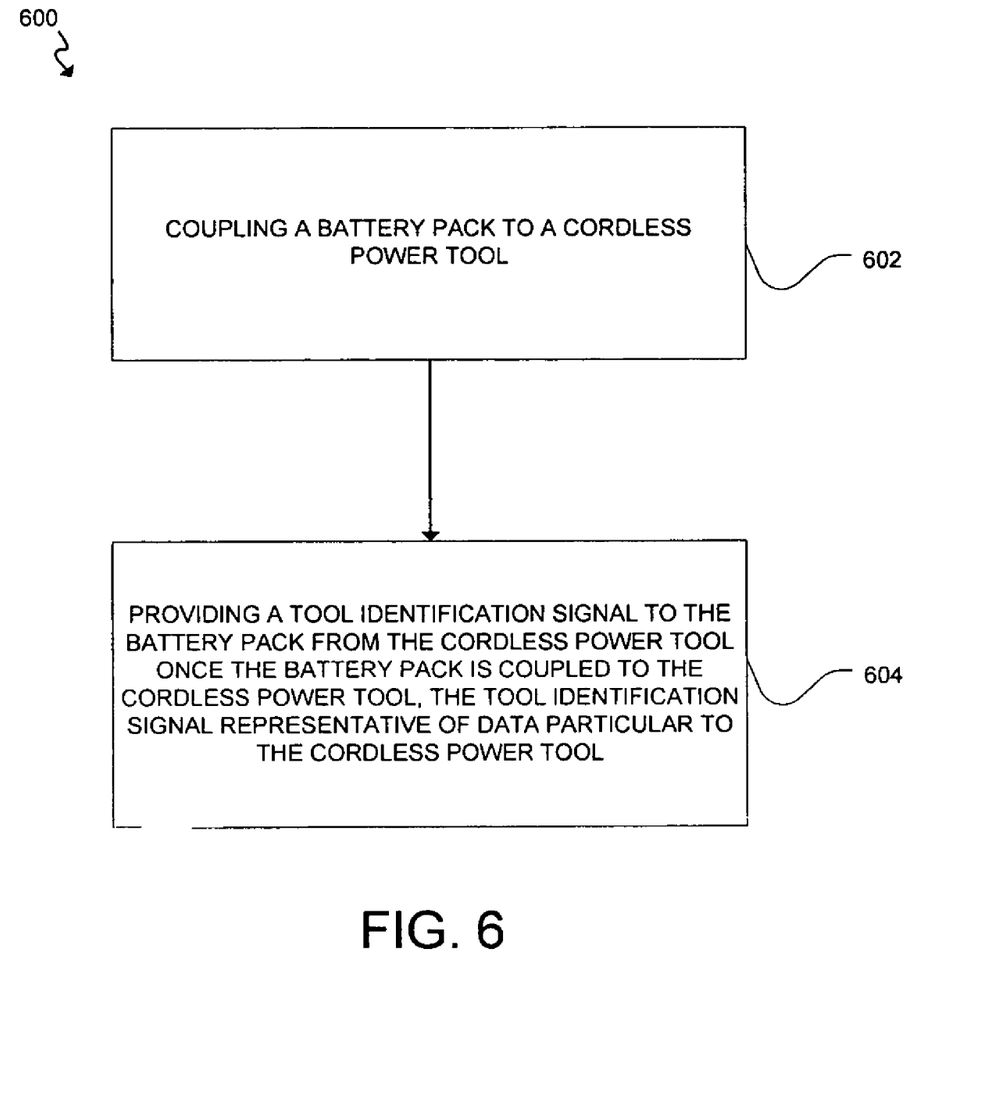
FIG. 6 is a flow chart of operations consistent with an embodiment.

FIG. 6 illustrates operations 600 according to an embodiment. Operation 602 may include coupling a battery pack to a cordless power tool. Operation 604 may include providing a tool identification signal to the battery pack from the cordless power tool once the battery pack is properly coupled to the cordless power tool, the tool identification signal representative of data particular to the cordless power tool.

Advantageously, the tool ID circuitry may enable the battery pack to receive data about a particular tool that it may otherwise not be aware. Such data may include data representative of the maximum discharge current of the particular cordless power tool, or a thermal overload point of the particular tool to name just a couple. In addition, the tool ID circuitry may provide a useful secondary indication that the battery pack has been correctly plugged into the appropriate cordless power tool. In the absence of a proper tool identification signal, the battery pack could deny discharge thereby improving system safety.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible.

What is claimed is:

1. A cordless power tool comprising:
tool identification circuitry to provide a tool identification signal to a battery pack, said tool identification signal representative of data particular to said cordless power tool, said tool identification circuitry also includes a resistor connected in parallel to a capacitor, wherein said resistor is configured to provide said tool identification signal representative of a first tool characteristic and discharging of said capacitor provides said identification signal representative of a second tool characteristic.

2. The cordless power tool of claim 1, wherein said data comprises a maximum discharge current of said cordless power tool.

3. The cordless power tool of claim 1, wherein said data comprises a thermal overload point of said cordless power tool.

4. The cordless power tool of claim 3, wherein said tool identification circuitry comprises a resistor having a fixed resistive value, and wherein said cordless power tool comprises a battery pack, said battery pack configured to provide a stimulus signal to said resistor when said battery pack is coupled to said cordless power tool and wherein said tool identification signal comprises a response to said stimulus signal.

5. The cordless power tool of claim 1, wherein said cordless power tool comprises a battery pack, said battery pack configured to provide a stimulus signal to said tool identification circuitry, said resistor providing said tool identification signal representative of said first tool characteristic in response to said stimulus signal.

6. A method comprising:
coupling a battery pack to a cordless power tool; and
providing a tool identification signal to said battery pack from said cordless power tool once said battery pack is coupled to said cordless power tool, said tool identification signal representative of data particular to said cordless power tool, wherein said cordless power tool includes a resistor connected in parallel to a capacitor, wherein said resistor is configured to provide said tool identification signal representative of a first tool characteristic and discharging of said capacitor provides said tool identification signal representative of a second tool characteristic.

7. The method of claim 6, wherein said wherein said data comprises a maximum discharge current of said cordless power tool.

8. The method of claim 6, wherein said data comprises a thermal overload point of said cordless power tool.

9. The method of claim 6, wherein if said battery pack is not properly coupled to said cordless power tool, said tool identification signal is not provided to said battery pack, and said battery back denies a discharge current to said cordless power tool if said tool identification signal is not received.

10. The method of claim 6, wherein said battery pack comprises monitoring and control circuitry configured to compare at least one monitored condition with a threshold, wherein said threshold is provided by said tool identification signal.

11. The method of claim 10, wherein said threshold is a discharge current threshold particular to said cordless power tool.

12. The method of claim 6, wherein said battery pack denies a discharge current to said cordless power tool if said tool identification signal is representative of an identity of a particular cordless power tool not supported by said battery pack.

13. The method of claim 6, wherein said battery pack provides a stimulus signal to said tool identification circuitry and wherein said tool identification signal provides a response to said stimulus signal.

14. A battery pack comprising:
at least one battery cell; and
monitoring and control circuitry configured to receive a tool identification signal from a cordless power tool once said battery pack is coupled to said cordless power tool, said cordless power tool includes a capacitor connected in parallel to a resistor, wherein said resistor is configured to provide said tool identification signal representative of a first tool characteristic and discharging of said capacitor provides said tool identification signal representative of a second tool characteristic.

15. The battery pack of claim 14, wherein said data comprises a threshold of a power parameter of said cordless power tool, wherein said monitoring and control circuitry is configured to compare at least one monitored condition with said threshold.

16. The battery pack of claim 15, wherein said threshold is a discharge current threshold particular to said cordless power tool, and said monitoring and control circuitry compares a monitored discharge current to said discharge current threshold and provides an output signal if said monitored discharge current is greater than or equal to said discharge current threshold.

17. The battery pack of claim 14, wherein said battery pack denies a discharge current to said cordless power tool if said tool identification signal is representative of an identity of a particular cordless power tool not supported by said battery pack.

18. The battery pack of claim 14, wherein said monitoring and control circuitry is further configured to provide a stimulus signal to said cordless power tool and wherein said tool identification signal is configured to provide a response to said stimulus signal.

* * * * *

UNITED STATES PATENT AND TRADEMARK OFFICE
CERTIFICATE OF CORRECTION

| | | |
|---|---|---|
| PATENT NO. | : 7,119,516 B2 | Page 1 of 1 |
| APPLICATION NO. | : 11/110255 | |
| DATED | : October 10, 2006 | |
| INVENTOR(S) | : Denning | |

It is certified that error appears in the above-identified patent and that said Letters Patent is hereby corrected as shown below:

In column 8, line 47, in Claim 7, delete "wherein said" before "data". (Second Occurrence)

In column 8, line 56, in Claim 9, delete "back" and insert -- pack --, therefor.

Signed and Sealed this

Twenty-sixth Day of December, 2006

JON W. DUDAS
*Director of the United States Patent and Trademark Office*